US009631330B2

(12) United States Patent
Fraundorfer

(10) Patent No.: US 9,631,330 B2
(45) Date of Patent: Apr. 25, 2017

(54) TRANSPORTABLE FOLDABLE BRIDGE

(71) Applicant: General Dynamics European Land Systems-Germany GmbH, Kaiserslautern (DE)

(72) Inventor: Werner Fraundorfer, Weilerbach (DE)

(73) Assignee: General Dynamics European Land Systems—Germany GmbH, Kaiserslautern (DE)

( * ) Notice: Subject to any disclaimer, the term of this patent is extended or adjusted under 35 U.S.C. 154(b) by 0 days.

(21) Appl. No.: 14/735,368

(22) Filed: Jun. 10, 2015

(65) Prior Publication Data
US 2015/0354152 A1 Dec. 10, 2015

(30) Foreign Application Priority Data
Jun. 10, 2014 (DE) .......................... 10 2014 008 178

(51) Int. Cl.
*E01D 15/12* (2006.01)
*B60F 5/00* (2006.01)
*E01D 15/127* (2006.01)

(52) U.S. Cl.
CPC ............... *E01D 15/12* (2013.01); *B60F 5/00* (2013.01); *E01D 15/124* (2013.01); *E01D 15/127* (2013.01)

(58) Field of Classification Search
CPC ....... E01D 15/00; E01D 15/127; E01D 15/22; E01D 15/12; E01D 15/124; B60F 5/00
See application file for complete search history.

(56) References Cited

U.S. PATENT DOCUMENTS

| | | | | |
|---|---|---|---|---|
| 3,010,128 A * | 11/1961 | Gillois | ................. | E01D 15/127 14/2.6 |
| 3,105,251 A * | 10/1963 | Stevens, Jr. | ........... | E01D 15/127 14/2.6 |
| 3,486,180 A | 12/1969 | Soeffge | | |
| 3,562,829 A * | 2/1971 | Soffge | .................. | E01D 15/127 14/2.4 |

(Continued)

FOREIGN PATENT DOCUMENTS

| | | | |
|---|---|---|---|
| DE | 1 680 207 A1 | 12/1971 | |
| DE | 1 658 621 B2 | 12/1974 | |

(Continued)

OTHER PUBLICATIONS

Singaporean Search Report for Singaporean Application No. 10201504515R dated Nov. 11, 2015—English translation.

*Primary Examiner* — Abigail A Risic
(74) *Attorney, Agent, or Firm* — Muncy, Geissler, Olds & Lowe, P.C.

(57) ABSTRACT

A transportable foldable bridge that has a folded transport state and an unfolded installation state. The bridge includes a first ramp element, a second ramp element and an intermediate element with two opposing ends. A first end of the intermediate element is connected to the first ramp element and the other end of the intermediate element is connected to the second ramp element. An articulating connection is provided between the first ramp element and the intermediate element. In the transport state, the first ramp element and the intermediate element are folded and the second ramp element constitutes an extension of the intermediate element.

13 Claims, 3 Drawing Sheets

(56) References Cited

U.S. PATENT DOCUMENTS

| | | | |
|---|---|---|---|
| 3,837,027 A | | 9/1974 | Gehlen |
| 3,908,580 A | * | 9/1975 | Kinzel .................... E01D 15/22 |
| | | | 14/2.6 |
| 4,386,441 A | * | 6/1983 | Lundholm .............. E01D 15/22 |
| | | | 14/2.6 |
| 4,510,637 A | * | 4/1985 | Zlotnicki .............. E01D 15/127 |
| | | | 14/2.4 |
| 4,602,399 A | * | 7/1986 | Jenkins ................ E01D 15/127 |
| | | | 14/2.4 |
| 2008/0189884 A1 | | 8/2008 | Wiedeck et al. |

FOREIGN PATENT DOCUMENTS

| | | |
|---|---|---|
| DE | DD 300 756 A7 | 7/1992 |
| DE | 10 2004 049 969 B3 | 12/2005 |
| DE | 10 2010 038 127 A1 | 4/2012 |
| FR | 1 550 111 A | 12/1968 |
| RU | 2 392 369 C1 | 6/2010 |
| SU | 837 994 | 6/1981 |

\* cited by examiner

TRANSPORTABLE FOLDABLE BRIDGE

This nonprovisional application claims priority under 35 U.S.C. §119(a) to German Patent Application No. 10 2014 008 178.8, which was filed in Germany on Jun. 10, 2014, and which is herein incorporated by reference.

BACKGROUND OF THE INVENTION

Field of the Invention

The present invention relates to a transportable foldable bridge that has a folded transport state and an unfolded installation state.

Description of the Background Art

Foldable transportable bridges, which are also known as scissors-type bridges, are already known.

For example, DE 10 2004 049 969 B3 and DE 10 2010 038 127 A1 describe scissors-type bridges, which are transported on a transport vehicle, in particular a tracked vehicle.

The foldable transportable bridges, in particular scissors-type bridges, all share the common feature that they are composed of two bridge elements that are connected to each other in an articulating fashion; in the transport state, when the bridges are being transported by the transport vehicle, the two bridge elements are folded together and in the installation state, the two bridge elements are unfolded and form a road surface.

In some situations, the bridges can already be changed into an unfolded state already on the transport vehicles in order to then be brought—by means of corresponding devices on the transport vehicle—into a desired installation position over an obstacle such as a river or trench. In this way, it is possible to quickly cross over obstacles such as rivers or trenches.

Since the bridge elements have a high dead weight, the weight distribution of the bridge elements on the transport vehicle plays an important role.

Particularly when unfolding the bridge elements on the transport vehicle, a shifting of the center of gravity of the bridge occurs so that when unfolding the heavy bridge halves, the center of gravity of the vehicle can be disadvantageously shifted, thus possibly requiring additional support devices attached to the bridge or the installation mechanism.

In order to solve this problem, DE 1 658 621 A discloses a folding bridge with two drive-on ramps that are displaced in folding fashion from the ends of a middle piece.

The bridge described in DE 1 658 621 A is optimized with regard to unfolding the bridge on the transport vehicle.

Transportable foldable bridges, however, are transported by a wide variety of different vehicles. Since the vehicles have different designs and sizes, the vehicles have different centers of gravity. Consequently, every vehicle is not suitable for transporting a predetermined transportable foldable bridge since the length and the center of gravity of the bridge are not matched to the length and the center of gravity of the transport vehicle.

SUMMARY OF THE INVENTION

It is therefore an object of the present invention to provide a transportable foldable bridge whose length and center of gravity can be changed so that the foldable bridge can be transported and installed by a wide variety of transport vehicles. Another object of the present invention is to provide an installation vehicle whose design allows it to transport and install the transportable foldable bridge.

The object is attained in an embodiment by a transportable foldable bridge that has a folded transport state and an unfolded installation state; the bridge has a first ramp element, a second ramp element, and an intermediate element with two opposing ends; one end of the intermediate element is connected to the first ramp element and the other end of the intermediate element is connected to the second ramp element; between the first ramp element and the intermediate element, an articulating connection is provided and in the transport state, the first ramp element and the intermediate element are folded and the second ramp element constitutes an extension of the intermediate element.

With the aid of the intermediate element, it is possible to vary the length of the bridge. In addition, folding one ramp element makes it possible to influence the location of the center of gravity of the bridge in the transport state. By suitably selecting the length and the location of the center of gravity of the bridge, it is possible to optimally match a foldable transportable bridge to the given size and the given center of gravity of a transport vehicle so that particularly for the transport of the bridge, no additional support devices on the transport vehicle are required.

With a first given transport vehicle that has a predeterminable center of gravity of the transport vehicle, it is advantageous that in a transport state of the bridge, the first ramp element is situated on top of the intermediate element and the first ramp element has approximately the same length as the intermediate element.

With another given transport vehicle that has a predeterminable center of gravity, it is advantageous that according to an alternative embodiment of a bridge, in a transport state of the bridge, the first ramp element is situated on top of the intermediate element and the first ramp element has a lesser or greater length than the intermediate element.

The first and second ramp element can have a predetermined length and the length of the intermediate element can be changeable. This makes it possible to use standardized first and second ramp elements for a wide variety of transport vehicles and it is only necessary to select a suitable intermediate element for a given transport vehicle.

In an embodiment, the intermediate element and the second ramp element are connected to each other by a locking hinge. This has the advantage that each ramp element can be used as either a first or second ramp element and if necessary, the first and second ramp elements can be connected to each other directly.

The free end of the second ramp element can be connected in an articulating manner to a pivot arm of a transport vehicle. This enables a simple installation of the bridge by means of the transport vehicle.

Another embodiment of the present invention provides an installation vehicle that is equipped with a bridge according to the invention.

In an embodiment, the installation vehicle has a support element onto which the bridge is loaded during transport.

A pivot arm is advantageously provided in the front part of the vehicle in order to move the bridge in pivoting fashion from the installation vehicle into the desired installation position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
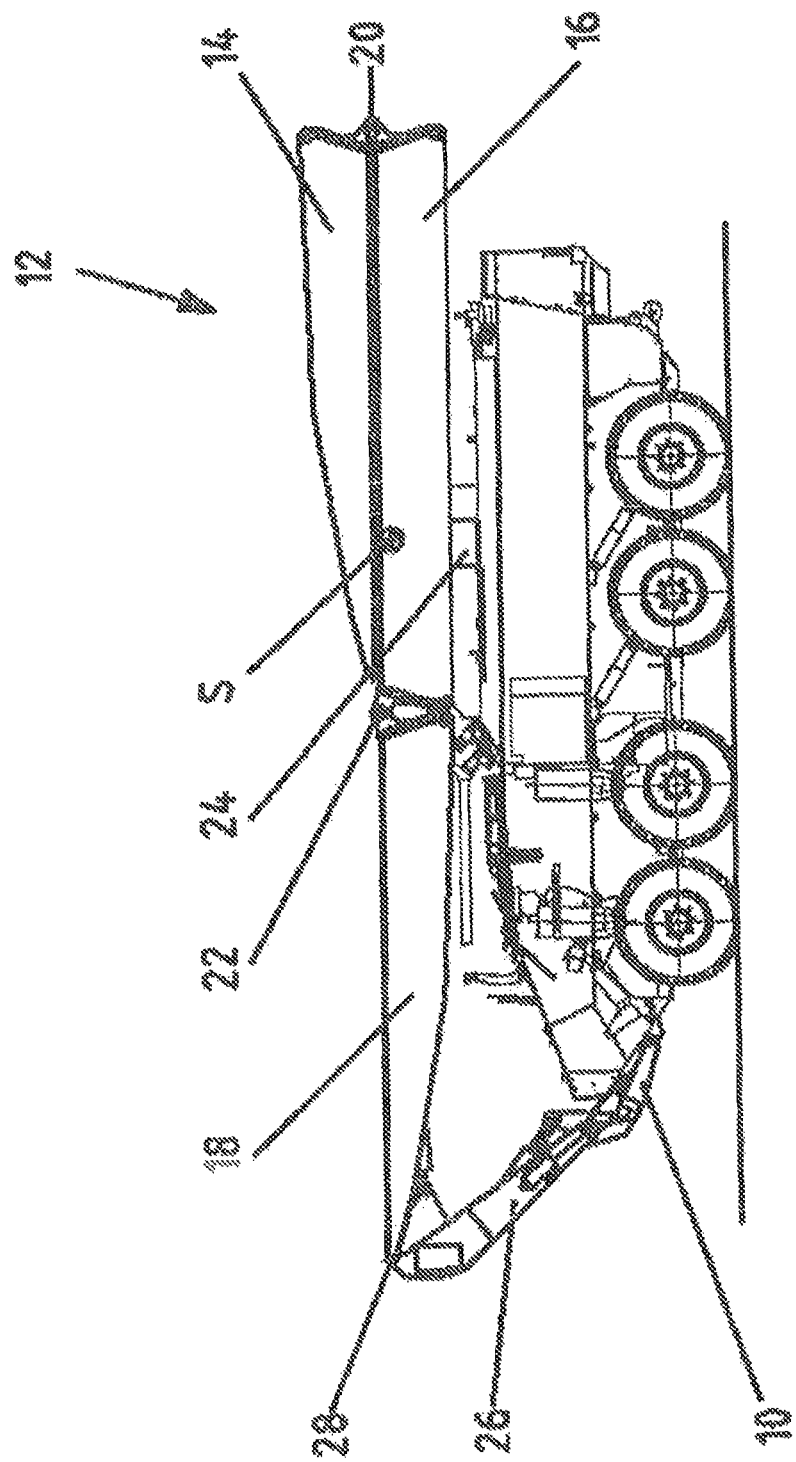
FIG. 1 shows an installation vehicle with a transportable foldable bridge in the transport state according to an embodiment.

FIG. 1 shows an installation vehicle 10 with a transportable foldable bridge 12 according to a first embodiment in a folded transport state.

The bridge 12 includes a first ramp part 14, an intermediate element 16, and a second ramp part 18. The first ramp part 14, the intermediate element 16, and the second ramp part 18 are embodied as separate bridge elements and each have a road surface or driving tracks.

The intermediate element 16 has two opposing ends; one end of the intermediate element 16 is attached to the first ramp element 14 and the other end of the intermediate element 16 is attached to the second ramp element 18. Between the first ramp element 14 and the intermediate element 16, there is an articulating connection 20 around which the first ramp element 14 can be pivoted.

In the transport state, the first ramp element 14 rests on the intermediate element 16 and has approximately the same length as the intermediate element 16.

The second ramp element 18 is likewise connected to the intermediate element 16 by means of an articulating connection 22. The second articulating connection 22 is locked so that the connection between the second ramp element 18 and the intermediate element 16 is embodied as fixed and the second ramp element 18 cannot pivot around the articulating connection 22.

The second ramp element 18 thus constitutes an extension of the intermediate element 16 in the transport state.

The provision of an articulating connection 22 between the second ramp element 18 and the intermediate element 16 offers the advantage that the individual bridge elements can be used in modular fashion. It is thus possible, for example, for the second ramp element 18 to be connected to the first ramp element 14 in articulating fashion by means of the articulating connection 22 in order to form a known two-part scissors-type bridge.

The bridge 12 is supported on a support element 24 of the installation vehicle 10. In particular, the bridge 12 is supported on the support element 24 of the installation vehicle 10, essentially in the region of the intermediate element 16.

The support element 24 is located on the top of the installation vehicle 10, approximately in the middle of the installation vehicle 10.

The bridge 12 is situated with its road surface or driving track facing downward on the support element 24.

The first ramp element 14, which is folded onto the intermediate element 16, is situated in the rear region of the installation vehicle 10. The second ramp element 18 is situated in the front region of the installation vehicle 10.

At the front end of the installation vehicle 10, a pivot arm 26 is provided. The end of the pivot arm 26 oriented away from the installation vehicle 10 is connected to the second ramp element 18 by means of an articulating connection 28. By means of the articulating connection 28, the bridge 12 can be pivoted from the installation vehicle 10 into the desired installation position.

The installation vehicle shown is a wheeled vehicle, but tracked vehicles can alternatively also be used as installation vehicles.

Figure 2:
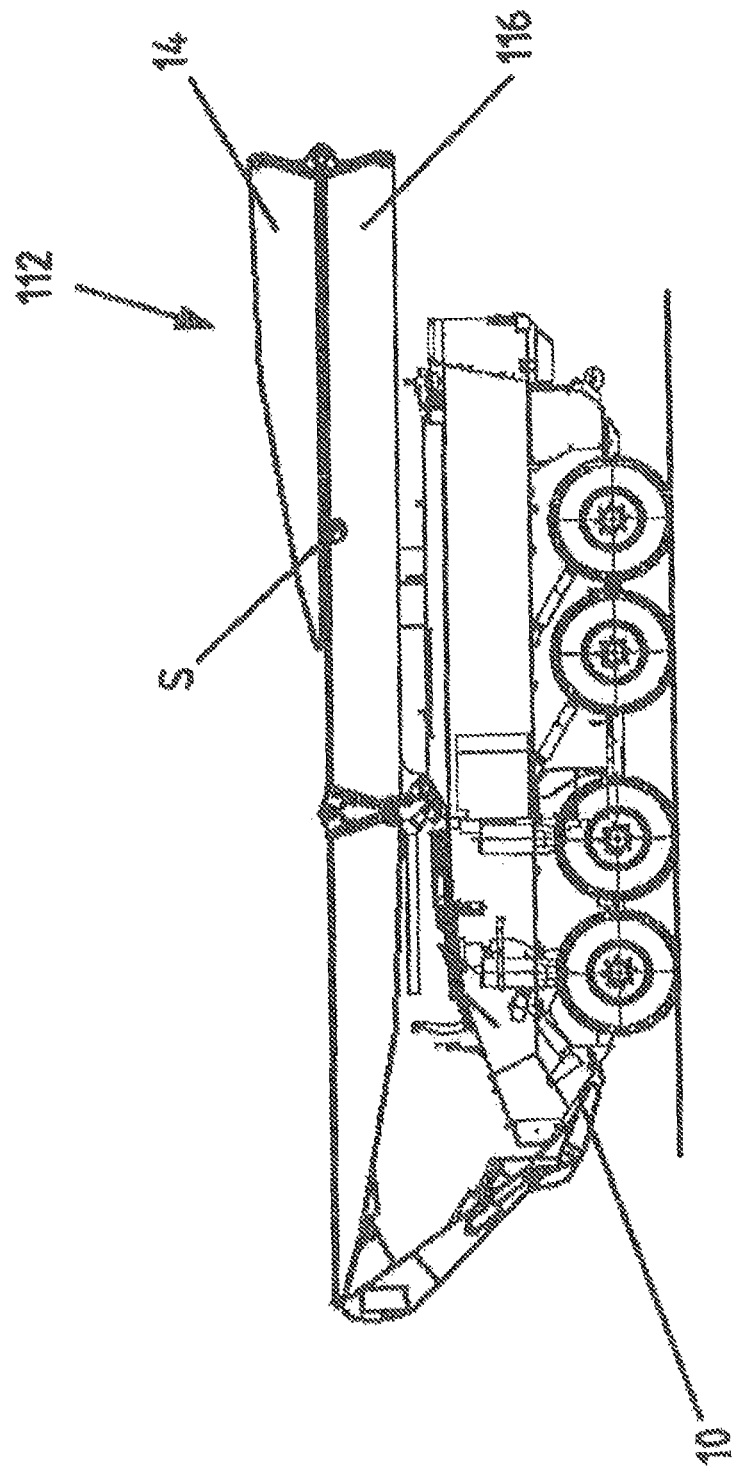
FIG. 2 shows an installation vehicle with a transportable foldable bridge in the transport state according to an embodiment.

FIG. 2 shows the installation vehicle 10 with another embodiment of a transportable foldable bridge 112.

The bridge 112 of the embodiment shown in FIG. 2 differs from the bridge 12 shown in FIG. 1 in that the intermediate element 116 of the bridge 112 shown in FIG. 2 has a greater length than the intermediate element 16 of the bridge 12 shown in FIG. 1. Consequently, the first ramp element 14 in the embodiment shown in FIG. 2 has a shorter length than the intermediate element 116. This results in the fact that the center of gravity S of the embodiment shown in FIG. 2 is shifted toward the rear region of the vehicle in comparison to the embodiment shown in FIG. 1.

In an embodiment, the intermediate element has a shorter length than the first ramp element so that the center of gravity or the vehicle with the bridge is shifted toward the front region of the vehicle in comparison to the embodiment shown in FIG. 1.

Figure 3:
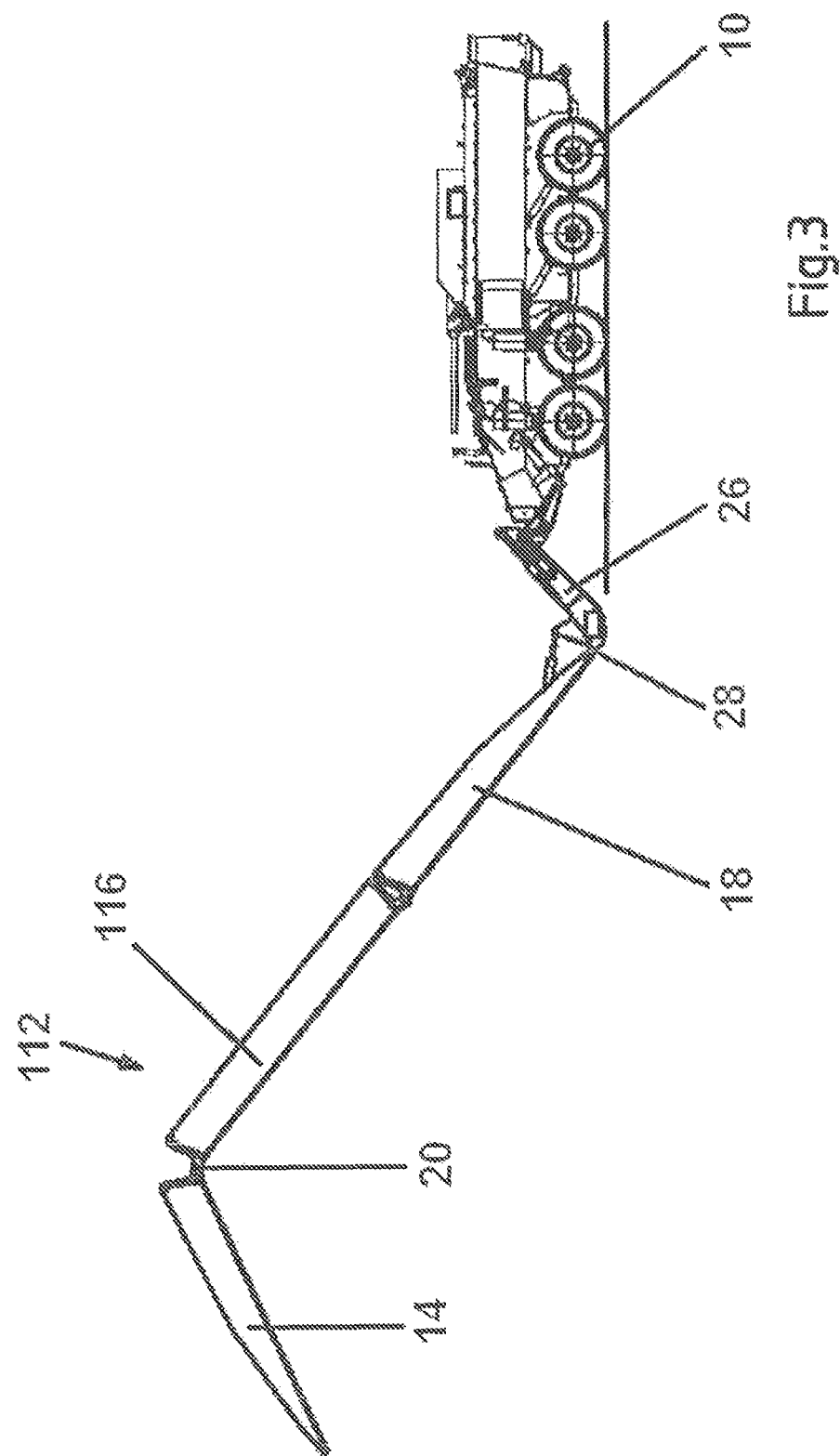
FIG. 3 shows the installation vehicle shown in FIG. 2, with a transportable foldable bridge during the changeover from a transport state into an installation state.

FIG. 3 shows the embodiment of an installation vehicle 10 shown in FIG. 2, with a transportable foldable bridge 112 during the changeover from a transport state into an unfolded installation state.

The pivot arm 26 on the installation vehicle 10 is pivoted downward and the second ramp element 18 and the intermediate element 116 that is rigidly connected to the second ramp element 18 have already been pivoted partially around the articulating connection 28 so that the transportable foldable bridge 112 is already partly situated over the obstacle that is to be bridged over.

The first ramp element 14 and the intermediate element 116 are almost completely unfolded in that the first ramp element 14 has already been mostly pivoted around the articulating connection 20.

In the installation state that is not shown, in which the bridge is situated over the obstacle that is to be bridged over, the second ramp element 18 and the intermediate element 116 are completely unfolded and the articulating connection 20 is locked. The second ramp element 18, the intermediate element 116, and the first ramp element 14 form a smooth surface on which vehicles can roll.

In the transportable foldable bridge 112 shown in FIG. 3, the unfolding of the bridge 112 and the pivoting of the bridge 112 into the installation position over an obstacle occur essentially at the same time.

From the installation state, the transportable foldable bridge 112 can be returned to the folded transport state again in order to be brought to a new installation site. Here, too, the folding of the bridge 112 and the pivoting from the installation position into the transport state can be carried out essentially at the same time.

The unlocking/locking of the hinges 20, 28 occurs automatically.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transportable foldable bridge that has a folded transport state and an unfolded installation state, the bridge comprising:
   a first ramp element having a road surface;
   a second ramp element having a road surface;
   an intermediate element with two opposing ends, a first end of the intermediate element being connected to the first ramp element and a second end of the intermediate element being connected to the second ramp element, the intermediate element having a road surface; and
   an articulating connection arranged between the first ramp element and the intermediate element,
   wherein, in the transport state, the first ramp element and the intermediate element are folded and the second ramp element constitutes an extension of the intermediate element,
   wherein, each of the first ramp element, the intermediate element and the second ramp element have the road surface that is a surface to be driven on and a bottom surface that opposes the road surface,
   wherein in the transport state, while the first ramp element and the intermediate element are folded, the bottom surface of the first ramp element contacts the bottom surface of the intermediate element, such that the road surfaces of each of the first ramp element and the intermediate element are turned outwards and the road surface of the second ramp element faces a same direction as the road surface of the intermediate element, and
   wherein the second ramp element has a free end connectable in an articulating manner to a pivot arm of a transport vehicle.

2. The bridge according to claim 1, wherein the first and second ramp elements have a predetermined length and the length of the intermediate element is changeable.

3. The bridge according to claim 1, wherein, in the installation state, the first ramp element and the intermediate element are unfolded.

4. The bridge according to claim 1, wherein the intermediate element and the second ramp element are connected to each other via a locking hinge.

5. An installation vehicle comprising a bridge according to claim 1, wherein, the installation vehicle is the transport vehicle.

6. The installation vehicle according to claim 5, wherein the transport vehicle has a support element on which the bridge is supported during transport.

7. The installation vehicle according to claim 5, wherein the pivot arm is provided in a front region of the vehicle.

8. The installation vehicle according to claim 5, wherein the transport vehicle has a support element on which the bridge is supported during transport, the support element being positioned substantially in a middle of a top side of the installation vehicle.

9. The bridge according to claim 1, wherein the bridge is transportable on a top side of the transport vehicle.

10. The bridge according to claim 1, wherein, in the transport state, the first ramp element is situated on top of the intermediate element and the intermediate element is situated on top of the transport vehicle, such that the intermediate element is positioned between the first ramp element and the transport vehicle in the transport state.

11. A transportable foldable bridge that has a folded transport state and an unfolded installation state, the bridge comprising:
   a first ramp element having a road surface;
   a second ramp element having a road surface;
   an intermediate element with two opposing ends, a first end of the intermediate element being connected to the first ramp element and a second end of the intermediate element being connected to the second ramp element, the intermediate element having a road surface; and
   an articulating connection arranged between the first ramp element and the intermediate element,
   wherein, in the transport state, the first ramp element and the intermediate element are folded and the second ramp element constitutes an extension of the intermediate element,
   wherein, each of the first ramp element, the intermediate element and the second ramp element have the road surface that is a surface to be driven on and a bottom surface that opposes the road surface,
   wherein in the transport state, while the first ramp element and the intermediate element are folded, the bottom surface of the first ramp element contacts the bottom surface of the intermediate element, such that the road surfaces of each of the first ramp element and the intermediate element are turned outwards and the road surface of the second ramp element faces a same direction as the road surface of the intermediate element, and
   wherein, in the transport state, the first ramp element is situated on top of the intermediate element and the first ramp element has approximately the same length as the intermediate element.

12. A transportable foldable bridge that has a folded transport state and an unfolded installation state, the bridge comprising:
   a first ramp element having a road surface;
   a second ramp element having a road surface;
   an intermediate element with two opposing ends, a first end of the intermediate element being connected to the first ramp element and a second end of the intermediate element being connected to the second ramp element, the intermediate element having a road surface; and
   an articulating connection arranged between the first ramp element and the intermediate element,
   wherein, in the transport state, the first ramp element and the intermediate element are folded and the second ramp element constitutes an extension of the intermediate element,
   wherein, each of the first ramp element, the intermediate element and the second ramp element have the road surface that is a surface to be driven on and a bottom surface that opposes the road surface,
   wherein in the transport state, while the first ramp element and the intermediate element are folded, the bottom surface of the first ramp element contacts the bottom surface of the intermediate element, such that the road surfaces of each of the first ramp element and the intermediate element are turned outwards and the road surface of the second ramp element faces a same direction as the road surface of the intermediate element, and
   wherein, in the transport state, the first ramp element is situated on top of the intermediate element and the first ramp element has a lesser or greater length than the intermediate element.

13. An installation vehicle comprising a transportable foldable bridge that has a folded transport state and an unfolded installation state, wherein the installation vehicle is a transport vehicle, the bridge comprising:
a first ramp element having a road surface;
a second ramp element having a road surface;
an intermediate element with two opposing ends, a first end of the intermediate element being connected to the first ramp element and a second end of the intermediate element being connected to the second ramp element, the intermediate element having a road surface; and
an articulating connection arranged between the first ramp element and the intermediate element,
wherein, in the transport state, the first ramp element and the intermediate element are folded and the second ramp element constitutes an extension of the intermediate element,
wherein, each of the first ramp element, the intermediate element and the second ramp element have the road surface that is a surface to be driven on and a bottom surface that opposes the road surface,
wherein in the transport state, while the first ramp element and the intermediate element are folded, the bottom surface of the first ramp element contacts the bottom surface of the intermediate element, such that the road surfaces of each of the first ramp element and the intermediate element are turned outwards and the road surface of the second ramp element faces a same direction as the road surface of the intermediate element, and
wherein the transport vehicle has a support element on which the bridge is supported during transport, wherein during transport, the intermediate element rests on the support element.

\* \* \* \* \*